Nov. 18, 1952  A. R. SHAY  2,618,775
REMOTE CONTROL ELECTRIC ARC WELDER
Filed July 29, 1948  4 Sheets-Sheet 1

INVENTOR.
Albert R. Shay.
BY Victor J. Evans & Co.
ATTORNEYS

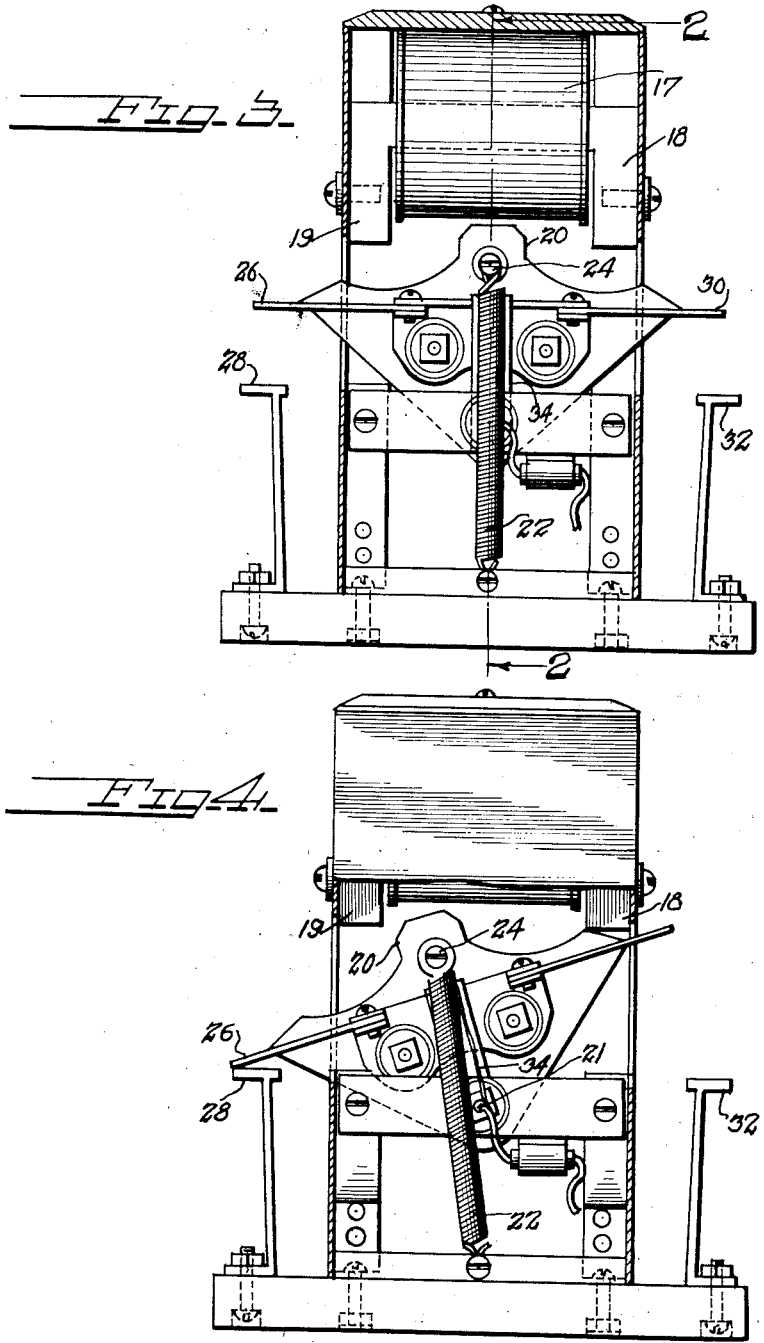

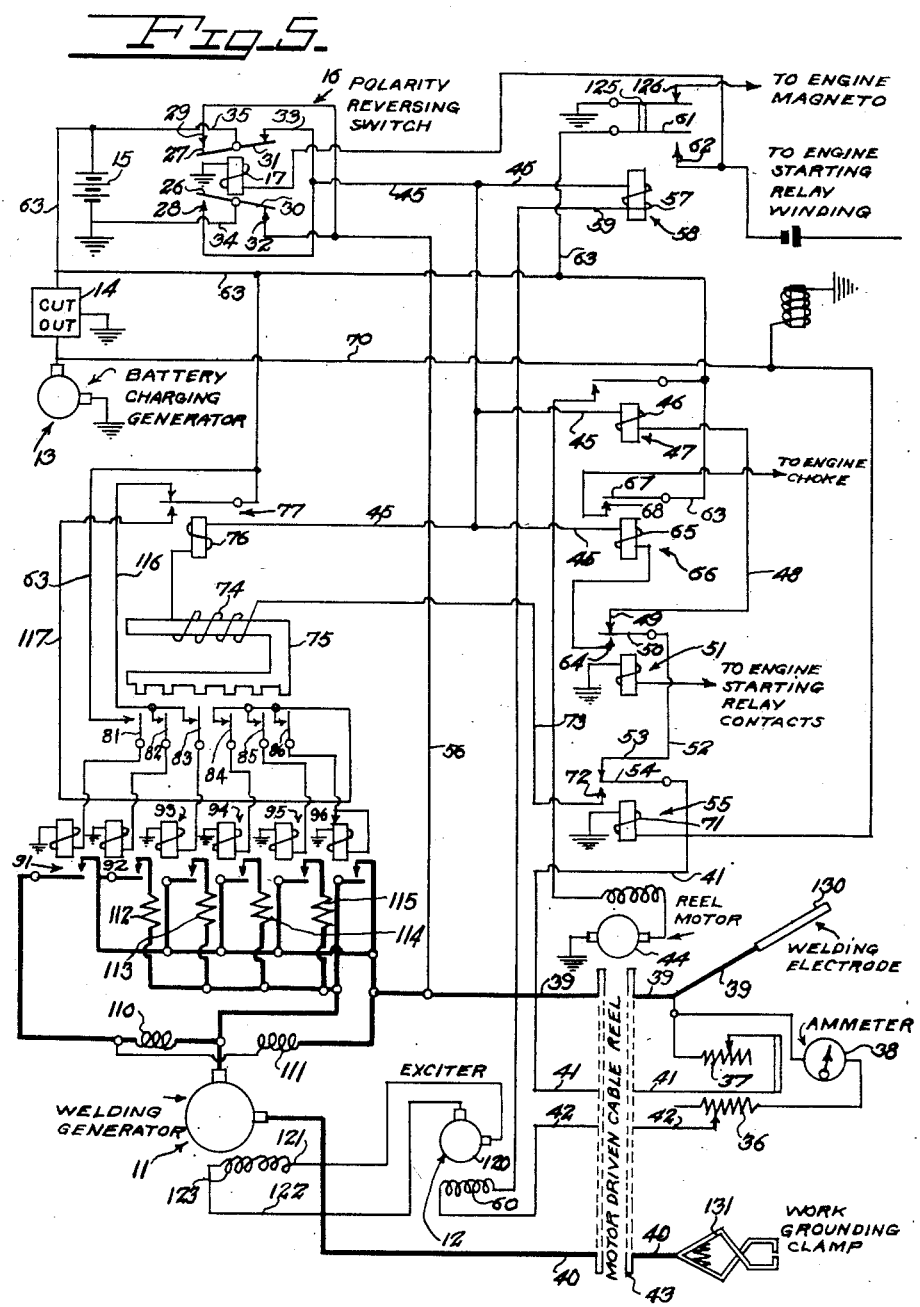

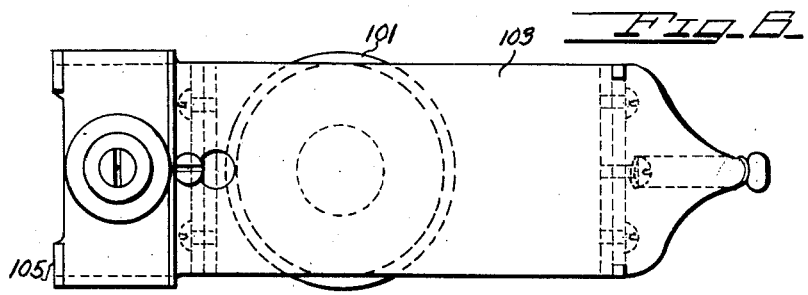
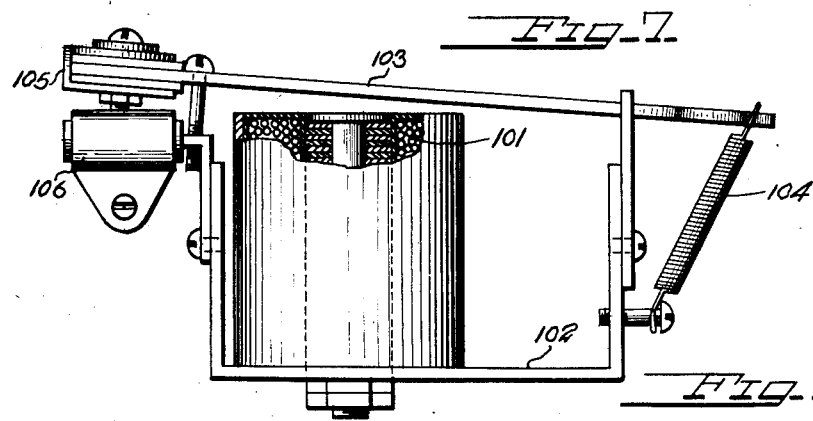
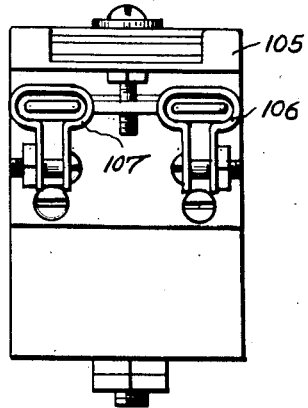
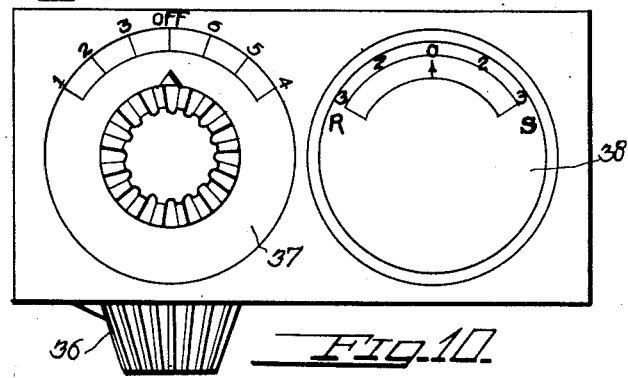
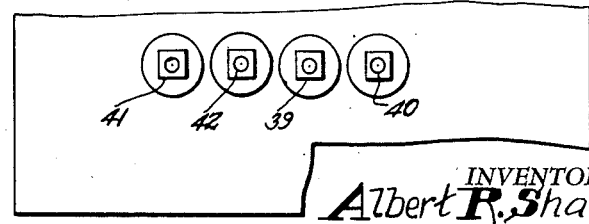

Patented Nov. 18, 1952

2,618,775

UNITED STATES PATENT OFFICE 2,618,775

REMOTE CONTROL ELECTRIC ARC WELDER

Albert R. Shay, Mantua, Ohio

Application July 29, 1948, Serial No. 41,266

1 Claim. (Cl. 322—6)

This invention relates to welding generators and more particularly to generators of this character driven by an internal combustion engine and provided with facilities for remote control of the generator.

An object of the invention is the provision of remote control facilities for starting and stopping the internal combustion engine which drives the generator.

Another object of the invention is the provision of independent facilities for remotely adjusting the exciter for the shunt field of the generator and also for changing the series field characteristics by means of remotely controlled shunts.

Still another object of the invention is the provision of a remotely controllable motor driven reel for storage of the welding and control cables. This permits the cable to be conveniently rolled up, driving the reel by the motor, and to be readily withdrawn as required by merely pulling on the cables.

Other and further objects will become apparent upon reading the following specification together wih the accompanying drawing forming a part hereof.

Fig. 3 is an elevational view of the reversing switch of Fig. 1 showing the switch in an intermediate transitory position.

Fig. 4 is an elevational view similar to Fig. 3 showing the switch de-energized and actuated to one of its two positions.

Fig. 5 is a schematic circuit diagram of an embodiment of the invention.

Fig. 6 is a plan view of a shunt control relay.

Fig. 7 is an elevational view of the relay of Fig. 6, partly broken away.

Fig. 8 is an end elevational view of the relay of Fig. 6.

Fig. 9 is a plan view of a remote control housing showing the external arrangement of the remote controls.

Fig. 10 is a bottom fragmentary view of the remote control housing shown in Fig. 9.

Figure 1:
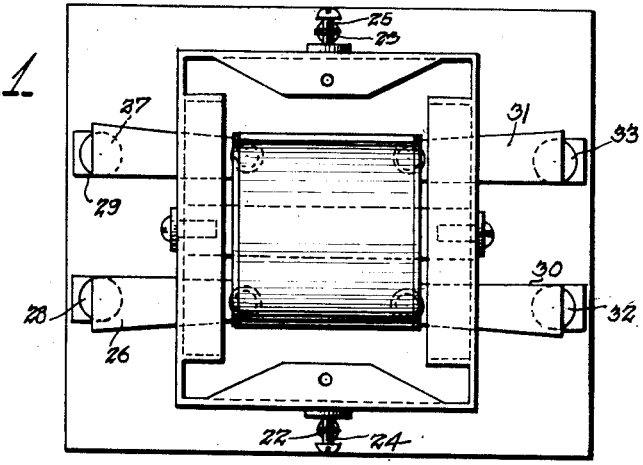
Fig. 1 is a plan view of a reversing switch used in practicing the invention.
Figure 2:
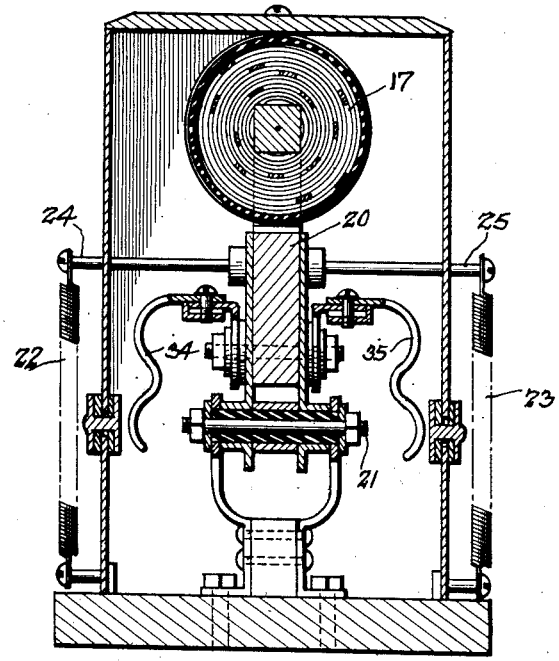
Fig. 2 is a sectional view in elevation of the reversing switch taken along the line 2—2 of Fig. 3, looking in the direction of the arrows.

Referring to Fig. 5, the entire system comprises an internal combustion engine (not shown) which may be of any desired and conventional type and which drives a welding generator designated generally as 11 together with its exciter 12 and the usual battery charging generator 13, which is provided with a reverse current cutout of conventional construction illustrated diagrammatically as 14, the cutout being arranged to prevent the battery 15 from driving generator 13 as a motor at times when the generator voltage is insufficient to deliver a charging current to the battery.

The several generators are all of the type in which the generated voltage remains fairly independent of engine speed after a predetermined minimum speed has been reached, and this has been indicated diagrammatically by showing their brushes arranged at right angles to each other. Generators of this type are well known and any desired form may be used.

A reversing switch, designated generally as 16 is arranged to reverse the polarity of the welding generator each time the engine starting control is operated. This permits the operator to select remotely the desired polarity for the work at hand, and also permits convenient reversal of the welding current polarity.

The polarity reversing switch comprises an operating winding 17 arranged to magnetize a pair of spaced pole pieces 18 and 19. Disposed intermediate pole pieces 18 and 19 is an armature member which is pivoted at 21 and which may therefore be brought selectively into proximity with either pole piece 18 or 19. A pair of tension springs 22 and 23 exert downward forces on pins 24 and 25 respectively thereby urging movable contacts 26 and 27 into relatively light but effective engagement with stationary contact members 28 and 29 respectively, as may best be seen in Fig. 4.

Upon energization of operating winding 17, armature 20 will be drawn strongly toward pole piece 19, causing flexure of contact fingers 26 and 27. Upon de-energization of operating winding 17, the springiness or elasticity of the flexed contact fingers 26 and 27 will cause armature 20 to travel past its center position against the tension of springs 22 and 23 thereby causing contacts 30 and 31 to engage stationary contacts 32 and 33 respectively similarly with light but effective pressure. In this latter position, armature 20 will be positioned to be strongly attracted to pole piece 18 upon the next energization of operating winding 17. Upon the ensuing de-energization of the winding 17, the armature 20 will be thrown back, returning to its original position as illustrated in Fig. 4 by virtue of the similar elasticity or springiness of flexed contact fingers 30 and 31. Connection to contacts 26 and 30 is established through a flexible conductor 34 and with contacts 27 and 31 through an independent flexible conductor 35. The several contacts 26 to 33 are connected as a reversing switch as may be seen in Fig. 5, successive energizations of winding 17 producing successive and corresponding reversals of polarity of the current derived through contacts 26 to 33 from battery 15.

The remote control apparatus comprises two rheostats 36 and 37 and an ammeter 38 which indicates both the polarity of the exciter and hence the welding generator as well as the degree of excitation and hence the open circuit welding voltage available.

The welding cables 39 and 40 together with the control conductors 41 and 42 are carried by a storage reel 43 which may be operated by an electric motor 44 for winding up the welding cables 39 and 40 together with the control conductors 41 and 42. The welding cables and conductors may be conveniently withdrawn to any desired extent by simply pulling thereon, thus rotating the reel. Action of reel motor may be controlled at will by means of rheostat 37 while the engine and generators are stopped, energy for this purpose being derived from battery 15. A circuit is traceable from the reversing switch along conductor 45, through winding 46 of relay 47, conductor 48, closed contacts 49—50 of relay 51, conductor 52, closed contacts 53—54 of relay 55 and conductor 41 to rheostat 37. This circuit is completed through welding cable 39 and conductor 56 to the other side of the reversing switch, thus energizing relay 47 at will by turning rheostat 37 to and from its off position.

Similarly, the engine may be started or stopped at will by turning rheostat 36 to and from its off position. This circuit is traceable from one side of the reversing switch through winding 57 of relay 58 and conductor 59 and through the field winding 60 of exciter 12 to conductor 42 which extends to rheostat 36. The circuit is completed through ammeter 38, welding cable 39, and conductor 56 to the other side of the reversing switch. This circuit causes energization of relay 58 which closes its contacts 61—62 connecting battery 15 through conductor 63 and contacts 61—62 to the winding of the engine starting relay (not shown). Closure of appropriate contacts of the engine starting relay causes the engine to crank from the usual starter and at the same time energizes relay 51 disengaging contact 50 from contact 49 and bringing it into engagement with contact 64. This transfers the control circuit responsive to the on or off positioning of rheostat 37 from the reel motor 44 to the winding 65 of relay 66, which may now be controlled at will instead of relay 47. The contacts 67—68 of relay 66 control the application of current from battery 15 via conductor 63 to an electrically controlled choke (not shown) for enriching the air-fuel mixture supplied by the engine carburetor during starting of the engine.

After the engine starts and comes up to speed, battery charging generator 13 builds up voltage causing the operation of cutout 14 and the flow of charging current to battery 15. Simultaneously, current from battery charging generator 13 is supplied via conductor 70 to the operating winding of relay 55. This causes contact 54 to break from its normal engagement with contact 53 and close a circuit to contact 72. This in turn prevents operation of reel motor 44 or the engine choke control by preventing operation of relays 47 and 66 respectively and establishes a control circuit for a group of series field shunts from rheostat 37 via conductor 41, closed contacts 54—72 of relay 55, conductor 73, winding 74 of multi-contact relay 75 and winding 76 of marginal relay 77 to conductor 45 which is energized from the reversing switch. The circuit is completed from the reversing switch via conductor 56 and welding cable 39. Multi-contact relay 75 is shown provided with a group of six independently movable armatures 81 to 86 which are of progressively increasing electromagnetic sensitivity. Armatures 81 to 86 engage corresponding contacts for the selective operation of relays 91 to 96 respectively, which are provided with heavy duty contacts appropriate for the control of the relatively heavy currents in the welding circuits.

The relays 91 to 96 are similar in construction, each of the relays being constructed as illustrated in Figs. 6, 7 and 8. Each relay is provided with an operating winding 101 secured to a frame 102 arranged to attract an armature 103 which is normally urged away therefrom by a retractible spring 104. A heavy conductive bridging member 105 is carried by armature 103 at its outer end and is arranged for bridging engagement between fixed contacts 106 and 107 when armature 103 is attracted by energization of operating winding 101.

As rheostat 37 is turned to increase the flow of current through operating windings 74 and 76 of relays 75 and 77 respectively, the armatures 81 to 83 are successively attracted causing successive operation of relays 91 to 93. Operation of relay 91 establishes a preparatory circuit for the selective connection of certain shunts by relays 92 to 95. Relay 92 uses the circuit established by relay 91 to connect shunt 112 across series field 110 of welding generator 11. Relay 93 then connects shunt 113 across series field 110 in multiple with shunt 112 already connected by relay 92. The relays 77 and 75 are so adjusted relative to each other that relay 77 operates and releases on current values in the range between the current values which determine the operation and release of armatures 83 and 84 or relay 75. Hence with further increase of current and the accompanying pulling in of armature 84, relay 77 operates and breaks the circuit of conductor 116 rendering armatures 82 and 83 ineffective to cause operation of relays 92 and 93 and at the same time preparing a circuit via conductor 117 for the operation of relays 94 to 96 by armatures 84 to 86. Armature 81 remains effective since its circuit includes a direct connection to battery 15 via conductor 63.

Further increase in current causes operation of relay 94 rendering shunt 114 effective and additional increase causes operation of relay 95 making the combination of shunts 114 and 115 in multiple effective as to series field 110. At maximum current in the relay circuit, relay 96 is operated through the circuit of armature 86 and the contacts of relay 96 are connected to shunt out the additional series field 111 directly. In this latter condition, series field 110 is shunted by shunts 114 and 115 in multiple and series field 111 is substantially entirely shunted out. Under this condition, the welding generator operates with a minimum of compounding action. Although rheostat 37 is shown diagrammatically in Fig. 5 as an ordinary rheostat, it may advantageously take the form shown in Fig. 9, in which six fixed conditions of adjustment are provided by a tap switch connected to one or more resistors which are connected to provide the appropriate resistance value in the circuit of control conductor 41. These predetermined fixed resistance values may be obtained by means of the tap switch arrangement illustrated in Fig. 10.

Rheostat 36 may be of conventional construction without any particular number of positions, and will provide fairly uniform current variation. The magnitude of this exciter field current is indicated by ammeter 38 and this magnitude will serve as an indication of the voltages being developed by exciter 12. The armature 120 of exciter 12 is directly connected by conductors 121 and 122 to the shunt field 123 of welding generator 11. The ammeter 38 thus serves to indicate the excitation of the welding generator 11 as well as the polarity established by reversing switch which in turn determines the polarity of this excitation and hence the polarity of the welding current. For this reason, ammeter 38 has been indicated as of the zero-center type.

When it is desired to stop the generator, rheostat 36 is turned to its "off" position, opening the circuit through exciter shunt field 60 and winding 57 of relay 58. This opens contacts 61—62 which closed the circuit to the engine starter. It also opens a circuit from contacts 61—62 to winding 17 of the reversing switch, allowing the flexed contact fingers 26, 27, or 30, 31, as the case may be, to throw the reversing switch to its other position so that the next starting will take place with reversed polarity. As relay 58 releases, contacts 125 and 126 close, applying a ground to the circuit of the engine magneto, thereby cutting off the ignition and stopping the engine.

It will be noted that the welding cables 39 and 40 have been shown provided with a welding electrode 130 and a work grounding clamp 132 respectively which are of usual construction in all respects.

While various changes may be made in the detail construction, it shall be understood that such changes shall be within the spirit and scope of the present invention as defined by the appended claim.

I claim:

In a system for remotely controlling the operation of an engine driven generator, an exciter for said generator, a battery charging generator, a reverse current cutout for said last generator, a reversing switch in circuit with said generators for reversing the polarity of the first generator, a rheostat in series with the field of the exciter, manually operable means for adjusting said rheostat and said rheostat having an off position, a shunt electrically connected to said first generator, a second rheostat electrically connected to said shunt and relay field circuit and said second rheostat having an off position and electrically connected to said reversing switch so that as said driven generator is controlled by said rheostat for the starting and stopping thereof said switch will be operated to change the polarity of said first generator.

ALBERT R. SHAY.

REFERENCES CITED

The following references are of record in the file of this patent:

UNITED STATES PATENTS

| Number | Name | Date |
| --- | --- | --- |
| 2,043,331 | Notvest | June 9, 1936 |
| 2,172,026 | Longley | Sept. 5, 1939 |
| 2,425,183 | Hall | Aug. 5, 1947 |